US010353466B1

(12) United States Patent
Keller et al.

(10) Patent No.: US 10,353,466 B1
(45) Date of Patent: Jul. 16, 2019

(54) SEMI-RIGID ASSEMBLY FOR MOVEMENT RESTRICTION VIA VARIABLE CURVATURE IN VIRTUAL REALITY HAPTIC DEVICES

(71) Applicant: Facebook Technologies, LLC, Menlo Park, CA (US)

(72) Inventors: Sean Jason Keller, Kirkland, WA (US); David R. Perek, Bellevue, WA (US); Tristan Thomas Trutna, Seattle, WA (US); Jack Lindsay, Seattle, WA (US); Nicholas Roy Corson, Mikilteo, WA (US); Raymond King, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/801,262

(22) Filed: Nov. 1, 2017

Related U.S. Application Data (60) Provisional application No. 62/416,169, filed on Nov. 2, 2016.

(51) Int. Cl.
*G06F 3/01* (2006.01)
*A41D 19/00* (2006.01)

(52) U.S. Cl.
CPC ......... *G06F 3/014* (2013.01); *A41D 19/0006* (2013.01); *A41D 19/0079* (2013.01); *G06F 3/016* (2013.01)

(58) Field of Classification Search
CPC ......... G06F 3/014; G06F 3/011; B32B 15/08; A63F 13/285; A41D 19/0006; A41D 19/0079
See application file for complete search history.

(56) References Cited

U.S. PATENT DOCUMENTS

| | | | |
|---|---|---|---|
| 2006/0115348 A1* | 6/2006 | Kramer | G06F 3/011 414/5 |
| 2015/0352813 A1* | 12/2015 | Galloway | B32B 15/08 602/13 |
| 2016/0296838 A1* | 10/2016 | Goetgeluk | A63F 13/285 |
| 2016/0363997 A1* | 12/2016 | Black | G06F 3/014 |

* cited by examiner

*Primary Examiner* — Richard J Hong
(74) *Attorney, Agent, or Firm* — Fenwick & West LLP (57) ABSTRACT

Embodiments herein disclose a haptic device that includes an elastic planar member. The haptic device also includes an inelastic planar member attached to the elastic planar member. Additional elastic and inelastic planar members may be attached to the inelastic planar member, with each elastic planar member attached to an inelastic planar member in an alternating fashion. An inflatable bladder is attached to a first surface of the inelastic planar member. Additional inflatable bladders may be attached to the additional inelastic planar members. The inflation of the inflatable bladder(s) causes a curvature in the inelastic planar member. This curvature increases the rigidity of the inelastic planar member.

20 Claims, 5 Drawing Sheets

SEMI-RIGID ASSEMBLY FOR MOVEMENT RESTRICTION VIA VARIABLE CURVATURE IN VIRTUAL REALITY HAPTIC DEVICES

CROSS-REFERENCE TO RELATED MATTERS

This application claims the benefit of U.S. Provisional Application No. 62/416,169, filed Nov. 2, 2016, and which is hereby incorporated by reference in its entirety.

BACKGROUND

The present disclosure generally relates to a system for haptic feedback to a user, and specifically a semi-rigid assembly for movement restriction via variable curvature.

Virtual reality (VR) is a simulated environment created by computer technology, and augmented reality (AR) is a live direct or indirect view of a physical, real-world environment whose elements are augmented (or supplemented) by computer technology. VR or AR can be presented to a user through a VR/AR system. Typically, a VR/AR system includes a VR/AR headset that provides visual and audio information to the user. Conventional VR/AR systems create virtual body parts (e.g., a virtual hand) in the simulated environment and use a tracking system to track a user movement in a physical space. The simulated environment presented to the user may be updated according to the user movement in the physical space. However, such systems generally do not prevent or control the user movement in the physical space, as the user is in contact with virtual objects in the simulated environment. As a result, the environment in the VR/AR space is not replicated in the real physical space in regards to a user's physical sensations.

SUMMARY

Embodiments herein disclose a haptic device that includes an elastic planar member. The haptic device also includes an inelastic planar member attached to the elastic planar member. Additional elastic and inelastic planar members may be attached to the inelastic planar member, with each elastic planar member attached to an inelastic planar member in an alternating fashion. An inflatable bladder is attached to a first surface of the inelastic planar member. Additional inflatable bladders may be attached to the additional inelastic planar members. The inflation of the inflatable bladder(s) causes a curvature in the inelastic planar member. This curvature increases the rigidity of the inelastic planar member.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Additionally, embodiments relate to a system and a method for providing haptic feedback to a user by adjusting, via a haptic assembly, a physical movement of a portion of the user. The adjusting of the physical movement is in response to a virtual position of the portion of the user in a VR space, an AR space, a MR space, or some combination thereof. The virtual position corresponds to a physical position of the portion of the user.

The haptic assembly includes a haptic movement restriction structure to restrict the movement of a user (e.g., a user's finger). The haptic movement restriction structure includes a series of alternating elastic and inelastic portions, with inflatable bladders attached to the inelastic portions. Upon the expansion of the inflatable bladders, the haptic movement restriction structure changes shape (e.g., into a concave shape) and restricts the movement along at least one axis. This allows the system to restrict the movement of the user. In one aspect, the haptic assembly is a haptic glove.

Overview of Haptic Movement Restriction Structure

Figure 1:
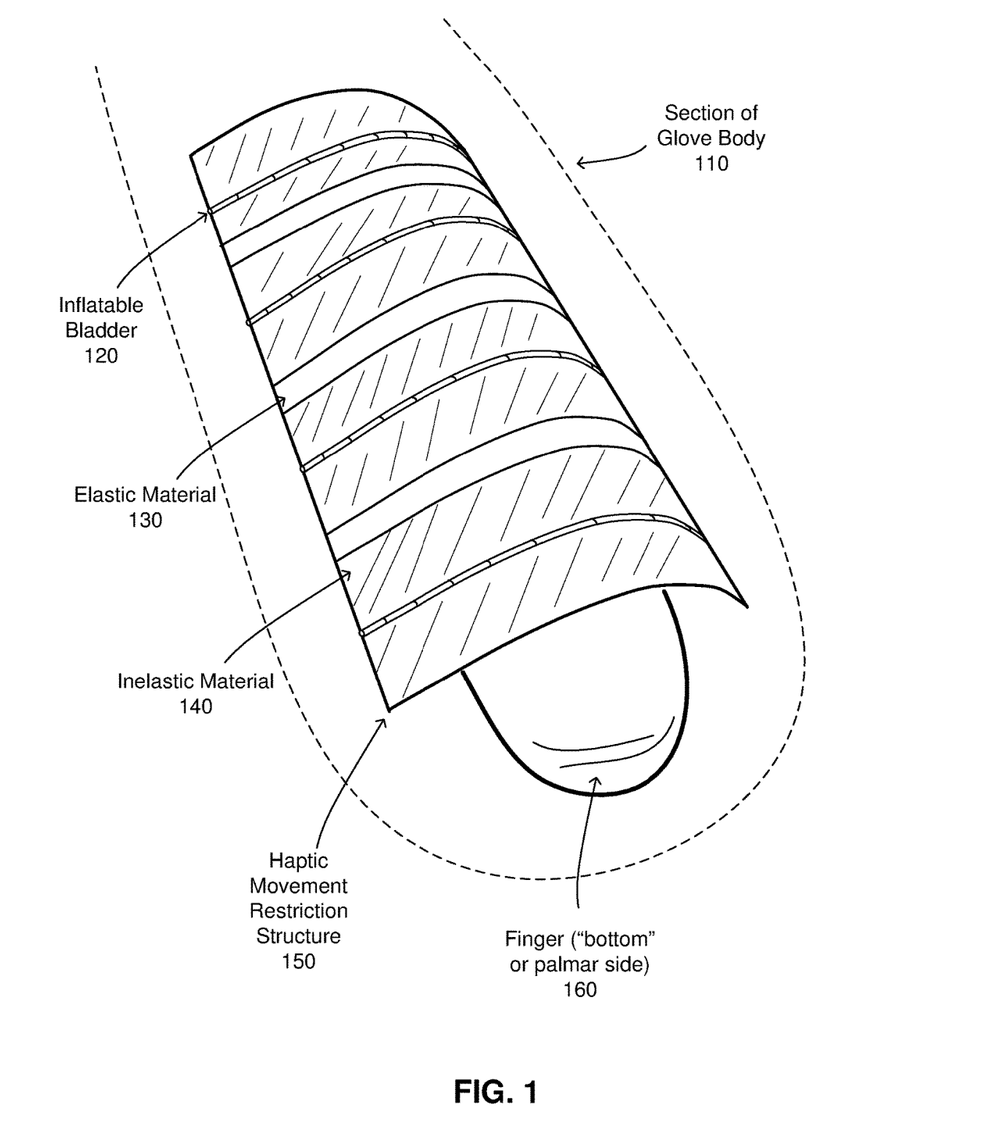
FIG. 1 is an illustration of a haptic movement restriction structure that may be used as part of a haptic glove, according to one embodiment.

FIG. 1 is an illustration of a haptic movement restriction structure 150 that can be used as part of a haptic assembly, according to one embodiment. In this embodiment, the haptic assembly is a glove, and the haptic movement restriction structure 150 is part of the glove. Although a particular orientation, number of segments, dimensions, and other properties of the haptic movement restriction structure 150 are shown in FIG. 1, in other embodiments the haptic movement restriction structure 150 may include different dimensions, number of segments, orientation, and so on.

The haptic movement restriction structure 150 may be used as part of a section 110 of a haptic glove body, as illustrated by the dashed lines in FIG. 1. The section 110 of the haptic glove body encloses a finger 160. The haptic glove body may be part of a larger virtual reality (VR) system, which may include virtual reality, mixed reality, and/or augmented reality components. Additional details regarding the haptic glove body are described below with regards to FIG. 3-5.

The haptic movement restriction structure 150 includes one or more inflatable bladders 120, one or more sections 130 of elastic material, and one or more sections 140 of inelastic material. As illustrated in FIG. 1, the haptic movement restriction structure 150 is in an inflated position. In this position, the inflatable bladders 120 of the haptic movement restriction structure 150 are inflated. The combination of the elastic material sections 130 and the inelastic material sections 140 cause the haptic movement restriction structure 150, when in an inflated position, to move from a flat planar shape to a curved planar shape. The curved planar shape of the haptic movement restriction structure 150 resists bending along an axis perpendicular to the curve direction, which prevents movement of the finger 160 such that the finger may be forced to stay in an extended, partially bent, or closed position. In another case, when the haptic movement restriction structure 150 is in an uninflated position (i.e., the inflatable bladder 120 is not inflated), the haptic movement restriction structure 150 may allow unrestricted movement of the finger 160.

The elastic material sections 130 are comprised of any elastic material that has characteristics that allow the material to be stretched to a threshold limit with a force that is within a range of forces exhibited by a human finger. In other words, the modulus of the elastic material sections 130 may be equivalent to the average bending force exhibited by a human finger (e.g., 20 Newtons of force) and the combined elastic limit of the elastic material sections 130 may allow the elastic material sections 130 to stretch at least to a point of a fully closed human finger (i.e., a fully bent human finger). This allows for the haptic movement restriction structure 150, when included in the haptic glove section 110, and when in an uninflated position, to bend along with the finger 160, from a fully extended finger to a fully closed finger. The bending force characteristic of the elastic material sections 130 may vary depending upon the finger (e.g., index finger, middle finger, etc.) for which the haptic movement restriction structure 150 is being used for, such that the force is equivalent to the force output by the particular finger.

The elastic material sections 130 may be comprised of 1) a polymer material, such as rubber, silicon rubber, or plasticine material, 2) an elastic mesh material, such as a polyester mesh or a mesh using organic fibers, and/or 3) a foam or sponge like material, such as polyurethane foam. Other types of materials, which are inherently elastic, or are constructed to be elastic, may also be used for the elastic material sections 130.

The inelastic material sections 140 are joined with the elastic material sections 130 and alternate with the elastic material sections 130 in the haptic movement restriction structure 150 as shown in FIG. 1. The inelastic material sections 140 are composed of material that is (generally) not elastic and not able to be stretched. When curved along one axis, as illustrated in FIG. 1, the inelastic material sections 140 may also be largely rigid along a perpendicular axis, with any flex or stretch limited to a threshold amount. Any amount of stretch is such that the shape of the inelastic material sections 140 are not significantly altered upon being stressed (e.g., not beyond 5%). This allows the inelastic material sections 140 to form a load bearing and structural component in the haptic movement restriction structure 150.

The inelastic material sections 140 may be made of various materials, such as 1) fabric, whether it be organic (e.g., cotton) or inorganic (e.g., nylon), 2) polymer, such as polyethelene, 3) an inelastic mesh, such as a polymer material woven in such a way as to be inelastic, and so on. The inelastic material sections 140 may also be made of other inelastic materials not explicitly listed.

The inflatable bladders 120 are joined with the inelastic material sections 140. When the inflatable bladders 120 are inflated (e.g., via an actuator coupled with a haptic glove to which the haptic movement restriction structure 150 is attached), the inelastic material sections 140 are curved due to the difference in length between the inflated inflatable bladders 120 and the length of the inelastic material sections 140. The inflatable bladders 120 may stretch or expand when inflated but the inelastic material sections 140 do not stretch, causing a concave curvature with a concavity in the inelastic material sections 140 that is opposite to the placement of the inflatable bladders 120 on the inelastic material sections 140. This curvature in the inelastic material sections 140 creates a rigidity in the haptic movement restriction structure 150, and prevents a certain degree of movement of the finger 160.

Both the elastic material sections 130 and the inelastic material sections 140 may be of a width that is sufficient to cover a majority of the circumference of the inside of the haptic glove body section 110 (e.g., 2 cm), and may be of a width such that when in an uninflated position, the haptic movement restriction structure 150 does not cause any movement restriction in the haptic glove body section 110 when the finger 160 is bent. The elastic material sections 130 and the inelastic material sections 140 may be of a thickness that does not cause a significant increase in the diameter of the haptic glove body section 110, but which allows for a durability of a certain threshold (e.g., of a particular mean time before failure). For example, the thickness may be 2 mm.

The number and length of the elastic material sections 130 and the inelastic material sections 140 may vary depending upon the finger that the haptic movement restriction structure 150 is being used for, with a longer digit having more sections or longer sections of material. The number and length may also depend upon whether a smoother or more continuous lengthwise bending of the haptic movement restriction structure 150 is desired, and/or may depend upon manufacturing costs, with a more continuous bend using more sections, and manufacturing cost restrictions causing less sections with longer lengths per section to be used. The number of segments may also vary depending upon the total fluid volume of the inflatable bladders 120 that is desired, with more sections where less fluid volume is desired (i.e., the bladders may be of smaller diameter where more sections are used). In one embodiment, the number of inelastic material sections 140 ranges from 2 to 15 sections for each finger. Each section of material may be of a different length compared to the other sections of material, and the number of elastic material sections 130 and inelastic material sections 140 may not be the same for one haptic movement restriction structure 150.

The elastic material sections 130 and inelastic material sections 140 are attached together along opposite edges of each section to form a combined structure that is longer than the individual sections along one dimension. The sections may be joined using an adhesive, by fusing the edges of the sections together (e.g., using heat), by stitching the sections together, or by some other means that allows a durable attachment between the sections.

The inflatable bladders 120 are hollow structures attached to the inelastic material sections 140 along one dimension of the inelastic material sections 140 parallel to the edges at which the elastic material sections 130 are attached. The inflatable bladders 120 can be inflated (i.e., filled) with fluid. The fluid may be a gas or liquid, such as carbon dioxide, atmospheric gas, water, oil, or some other fluid. The fluid may be transmitted to the inflatable bladders 120 via one or more pumps, actuators, or other fluid transfer devices (not shown) in the haptic glove body. The inflatable bladders 120 may be sealed other than for an opening to allow for a connection to the fluid transfer devices. This opening may be at one of the longitudinal ends of the inflatable bladders 120, or may be at some other point. The fluid transfer devices may be located alongside or in close vicinity to the haptic movement restriction structure 150 (e.g., within 5 cm), or may be located elsewhere on the haptic glove body (e.g., on the distal side of the palm area of the haptic glove body). The inflatable bladders 120 may be connected to a separate fluid transfer devices, or may be connected to a single fluid transfer device.

Upon receiving a haptic feedback signal, the haptic glove body may transmit a signal to the fluid transfer devices, causing them to transmit fluid to the inflatable bladders 120. This inflates the inflatable bladders 120, causing a curvature in the inelastic material sections 140 due to a difference in length between the inflated inflatable bladders 120 and the inelastic material sections 140. In turn, this causes a curvature in the haptic movement restriction structure 150, which causes a restriction of physical movement of the finger 160. Upon another haptic feedback signal, the fluid transfer devices may transmit (suction) fluid away from the inflatable bladders 120, causing the inflatable bladders to deflate, thereby causing a decrease in the curvature of the haptic movement restriction structure 150. This decreases or eliminates the restriction of physical movement of the finger 160.

The inflatable bladders 120 can be attached to the inelastic material sections 140 along any point of the inelastic material sections 140, such as the midpoint of the inelastic material section 140. Each inelastic material section 140 may have zero, one, or many inflatable bladders 120. For example, those sections of the haptic movement restriction structure 150 that may need additional structural support may include more than one inflatable bladder 120 per inelastic material section 140. The attachment of the inflatable bladders 120 to the inelastic material section 140 may be along a longitudinal axis of the inflatable bladder 120, and may be continuous (i.e., each point along the axis is attached to the inelastic material 140), or may be spaced apart (i.e., multiple non-connected attachment points).

The inflatable bladders 120 include an internal diameter and an external diameter. The internal diameter is the diameter of the hollow space inside the inflatable bladder 120 through which fluid flows. This diameter may be set such that fluid flowing into the inflatable bladders 120 can cause the inflatable bladder 120 to reach a fully inflated state within a certain threshold time (e.g., 100 ms). This diameter may also be set to limit the volume of fluid used in the system to a certain limit. The outer diameter may be set such that the protrusion of the inflatable bladder 120 from the haptic movement restriction structure 150 is below a certain threshold (e.g., 5 mm). In some cases the inflatable bladders 120 may be recessed within the inelastic material sections 140 such that the diameter of the inflatable bladders 120 may be larger than the threshold without causing a significant protrusion. The outer diameter may also be set such that the difference between the inner and outer diameters is enough to allow for a certain durability of the inflatable bladder 120 through multiple inflations and deflations. The diameters of the inflatable bladders 120 may differ for each bladder across the length of the haptic movement restriction structure 150. For example, bladders in areas requiring additional force to restrict movement may have larger diameters.

The inflatable bladders 120 may be constructed of a material that is impermeable to the fluid that is chosen for the bladders, and which does not expand significantly in response to an increase in fluid pressure within the bladders. The material may also be durable in response to bending stresses and to the repeated ingress and egress of the fluid within the bladders. The material may be a polymer, such as silicon rubber, an impermeable fabric, such as vinyl, or some other material.

The overall materials chosen for the inelastic and elastic sections as well as the inflatable bladders may further adhere to weight limits. The combination of the chosen materials in the haptic movement restriction structure 150 may be selected such that the weight of the haptic movement restriction structure 150 is below a threshold level (e.g., 20 grams per cm of structure) or such that it does not appreciably increase the total weight of the haptic glove body (e.g., less than 5% weight increase).

In one embodiment, the haptic movement restriction structure 150 may be composed of tiled sets of elastic and inelastic sections, with inflatable bladders attached in both longitudinal and latitudinal orientations such that the haptic movement restriction structure 150 may restrict physical movement in two dimensions, instead of the single dimension depicted in FIG. 1. For example, the elastic and inelastic sections may alternate as shown in FIG. 1, but may further be interwoven with additional elastic and inelastic sections at a 90 degree angle. The inflatable bladders may be attached to the inelastic sections and may also intersect at right angles as well.

Although the curvature, or concavity, is shown to be facing the finger 160 in the illustration of FIG. 1, in other embodiments the concavity may be facing away from the finger 160, and the haptic movement restriction structure 150 may be placed at the dorsal side of the finger 160.

Using the haptic movement restriction structure 150 as illustrated in FIG. 1, a system may be able to generate a realistic physical movement restriction effect for a user of the haptic glove that includes the haptic movement restriction structure 150. By using the inflatable bladders instead of electrical servo units or other devices, the haptic movement restriction structure 150 may be able to integrate with existing fluidic circuits within the haptic glove body, without significantly increasing weight, cost, complexity, and other factors. The structure may also impart high reliability, with few moving parts and a solid design using durable parts that do not require significant maintenance levels. Such a structure, in contrast to an electro-mechanical device, is also washable, and can be easily cleaned if needed.

Operation of Haptic Movement Restriction Structure

Figure 2:
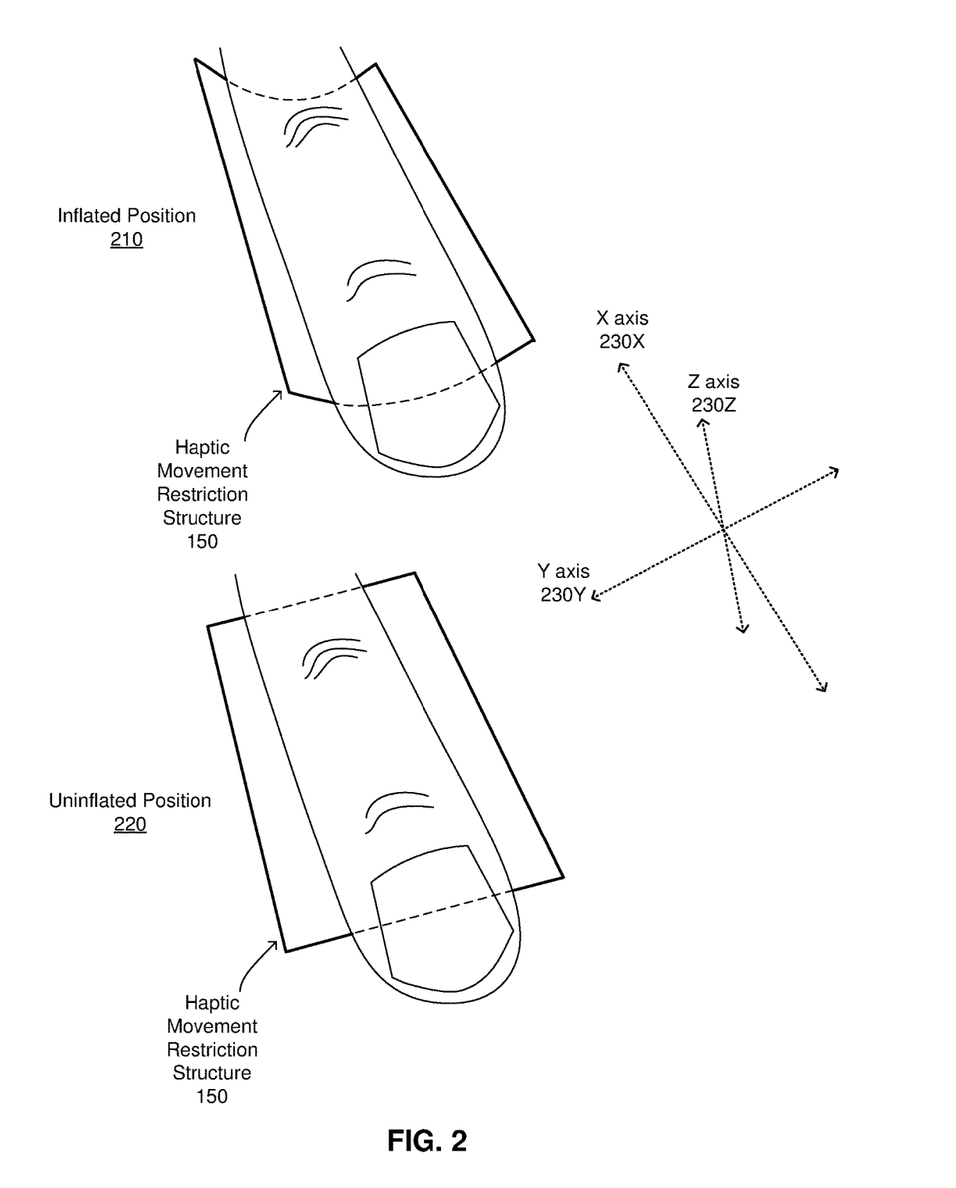
FIG. 2 illustrates an operation of the haptic movement restriction structure, according to one embodiment.

FIG. 2 illustrates an operation of the haptic movement restriction structure 150, according to one embodiment. Two positions, an inflated position 210, and an uninflated position 220, are shown. However, in other embodiments the position of the haptic movement restriction structure 150 may be in-between the inflated and uninflated positions. Furthermore, different sections of the haptic movement restriction structure 150 may be inflated to different levels, causing the sections of the haptic movement restriction structure 150 to be different positions. Additionally, the dimensions of the haptic movement restriction structure 150 relative to the finger 160 may be different in some embodiments than the dimensions shown in FIG. 2. The haptic movement restriction structure 150 in FIG. 2 is shown as a single sheet of material for illustration purposes, although it includes the inelastic material sections, elastic material sections, and inflatable bladders as shown in FIG. 1.

Referring to the inflated position 210 illustrated in FIG. 2, the inflatable bladders 120 of the haptic movement restriction structure 150 are inflated to a full position with a certain pressure (e.g., 50 kpa). The inflatable bladders 120 are on the obverse side of the haptic movement restriction structure 150 as shown in FIG. 2, and thus are not visible. However, as previously shown in FIG. 1, the inflatable bladders 120 are attached to the inelastic material sections 140 of the haptic movement restriction structure 150.

In FIG. 2, the X axis 230X spans the finger length, the Y axis 230Y is perpendicular to the X axis 230X, and the Z axis 230Z is normal to the plane of the haptic movement restriction structure 150. In the inflated position 210, the curvature of the haptic movement restriction structure 150 along the Y axis 230Y causes a physical restriction of movement of the finger 160. The substantially planar material of the haptic movement restriction structure 150, when curved, resists movement along the axis perpendicular to the curvature, i.e., the X axis 230X, and thus in FIG. 2 the haptic movement restriction structure 150 resists the bending of the finger 160.

On the other hand, when in the uninflated position 220, the haptic movement restriction structure 150 is not curved, and substantially resides in a single plane, as shown. In such a case, the haptic movement restriction structure 150 may not significantly restrict any physical movement, thus allowing the finger 160 to be in any position (bent or unbent).

The inflated position 210 can be used to restrict the motion of a wearer of the haptic glove when the haptic glove body receives a signal to restrict the movement of the wearer's finger. For example, the wearer of the haptic glove body may have encountered some sort of object in a VR environment, although a corresponding object does not exist in the physical world. The wearer may attempt to grab the object, and upon grabbing the object, the haptic glove body may receive a signal from the system indicating that the movement in the wearer's fingers should be restricted. The haptic glove body, in response, may transmit fluid to the haptic movement restriction structure 150, causing the haptic movement restriction structure 150 to restrict the movement of the wearer's fingers to a certain degree (e.g., by inflating one or more of the inflatable bladders of the haptic movement restriction structure 150) such that the physical restriction creates a sensation for the wearer that simulates the grabbing of the virtual object.

Once the wearer releases the grip on the virtual object in the VR environment, the haptic glove body may receive a signal indicating that physical movement in the fingers of the wearer should no longer be restricted, and the haptic movement restriction structure 150 transmits fluid from the inflatable bladders 120 of the haptic movement restriction structure 150 (and into a reservoir) such that physical movement in the haptic movement restriction structure 150 is no longer restricted. In the VR environment, the wearer is now able to freely move his or her fingers, simulating a situation where the wearer is no longer gripping the object.

Haptic Glove Body System Environment

Figure 3:
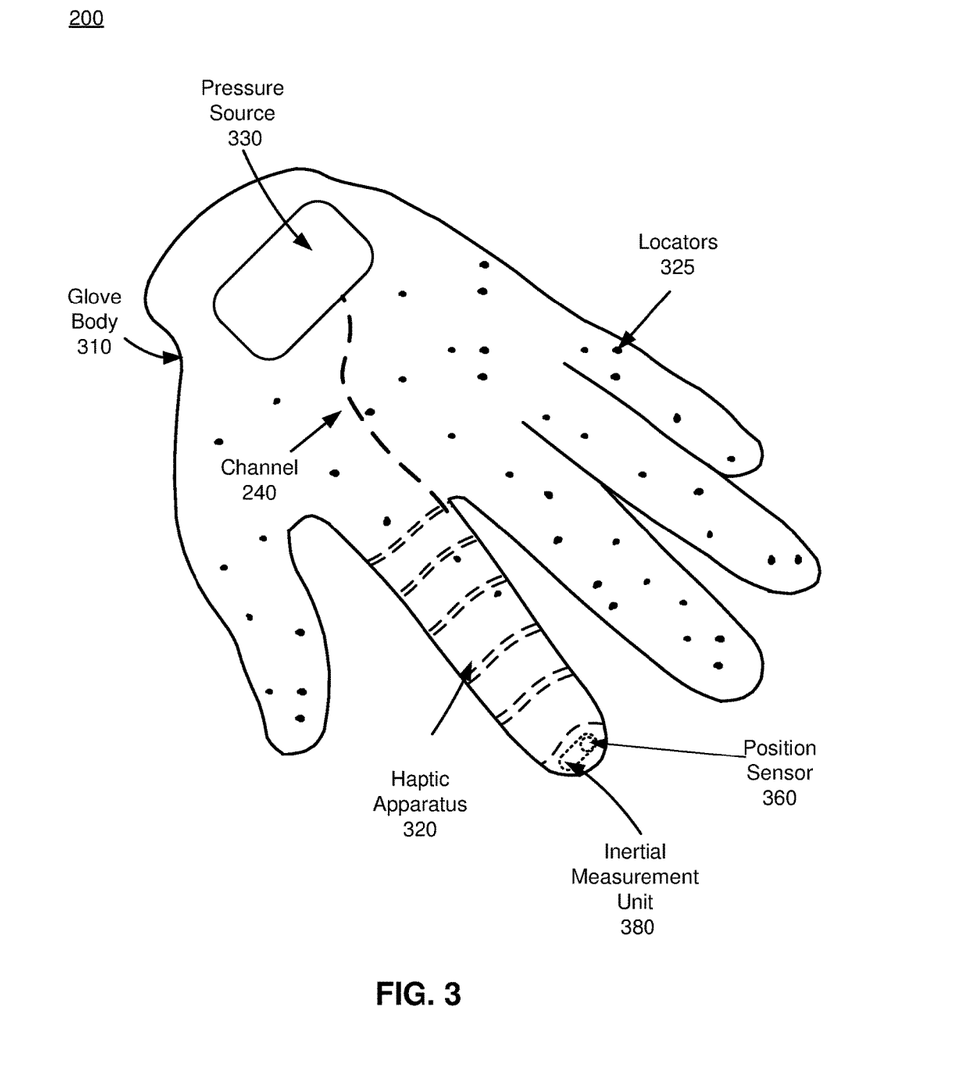
FIG. 3 is a perspective view of a haptic glove, in accordance with an embodiment.

FIG. 3 is a perspective view of a haptic glove 300, in accordance with an embodiment. The haptic glove 300 includes a glove body 310, a haptic apparatus 320, a pressure source 330, and a channel 340. Additionally, in some embodiments, the haptic glove 300 may also include locators 325, a position sensor 360, and an inertial measurement unit (IMU) 380. In some embodiments, the section of the haptic glove body 110 may be a section of the haptic glove body 310, and the haptic apparatus 320 may be the haptic movement restriction structure 150 of FIG. 1.

The glove body 310 is an apparatus covering a hand. The glove body 310 is a garment that is coupled to the position sensor 360, the haptic apparatus 320, the pressure source 330, and the channel 340 (e.g., a tube). In one embodiment, the position sensor 360 is coupled to a corresponding finger of the glove body 310 (e.g., a portion corresponding to a fingertip); the haptic apparatus 320 is coupled to a corresponding finger portion (e.g., a portion corresponding to one or more joints between two phalanges) of the glove body 310; and the pressure source 330 is coupled to a portion of the glove body 310 corresponding to a back of a hand (i.e., dorsal side). The channel 340 is coupled between the pressure source 330 and the haptic apparatus 320. In one embodiment, one or more of these components are placed beneath an outer surface layer of the glove body 310, thus are not visible from the outside. Additionally or alternatively, some of these components are placed on an outer surface layer of the glove body 310, and are visually detectable.

The glove body 310 illustrated in FIG. 3 is merely an example, and in different embodiments, the glove body 310 includes fewer, more or different components than shown in FIG. 3. For example, in other embodiments, there can be multiple haptic apparatuses 320 (e.g., one or more on each finger) and multiple tubes 340. In addition, in other embodiments, there may be multiple position sensors 360 provided. Also, in one or more embodiments, one or more haptic apparatuses 320 and the pressure source 330 can be positioned in different places than shown in FIG. 3. For example, additional haptic apparatuses 320 and the position sensors 360 are located at different parts of the glove body 310. For another example, the pressure source 330 is coupled to a different portion of the glove body 310 corresponding to, for example a wrist or a palm.

In one embodiment, the glove body 310 includes locators 325. The locators 325 are objects located in specific positions on the glove body 310 relative to one another. Additional details regarding the configuration and operation of the locators 325 are described with regards to the locators 420 of FIG. 4.

In one embodiment, the glove body 310 includes a position sensor 360. The position sensor 360 generates one or more measurement signals in response to motion of the haptic glove 300. Additional details regarding the configuration and operation of the position sensor 360 are described with regards to the position sensor 525 of FIG. 5.

In one embodiment, the glove body 310 includes an IMU 380. The IMU 380 is an electronic device that generates fast calibration data based on measurement signals received from one or more of the position sensors 360. Based on the one or more measurement signals from one or more position sensors 360, the IMU 380 generates fast calibration data indicating an estimated position of the haptic glove 300 relative to an initial position of the haptic glove 300. Additional details regarding the configuration and operation of the IMU 380 are described with regards to the IMU 530 of FIG. 5.

The haptic apparatus 320 (represented by the dashed lines) provides haptic feedback including a perception of a user touching a virtual object. In one embodiment, the haptic apparatus 320 is the haptic movement restriction structure 150 described with reference to FIG. 1. In one embodiment, the haptic apparatus 320 is actuated according to pressure applied from the pressure source 330. The pressure applied from the pressure source 330 may transmit fluid to one or more of the inflatable bladders of the haptic apparatus 320. These inflatable bladders may be, e.g., the inflatable bladders 120 of FIG. 1. The haptic apparatus 320 may cover one or more joints between phalanges of the glove body 310, or may cover the entire glove body 310. In another embodiment, several haptic apparatuses 320 are placed on other parts (e.g., an area corresponding to a joint between two different fingers) of the glove body 310. In other embodiments (not shown), other or all of the glove digits may include respective haptic movement restriction structures that are each coupled to the pressure source 330 (or some other pump) via one or more channels.

The pressure source 330 modulates the haptic apparatus 320 by adjusting a pressure of the fluid in the inflatable bladders of the haptic apparatus 320. The pressure source 330 adjusts the pressure of the inflatable bladders of the haptic apparatus 320 by injecting (or ejecting) fluid or gas (e.g., air), which may be under pressure greater than atmospheric pressure. The inflatable bladders of the haptic apparatus 320 can be inflated to prevent a user movement or deflated to enable a user movement, according to pressure applied from the pressure source 330. In one embodiment, the pressure source 330 is a pump.

In some embodiments, the pressure source 330 receives a haptic feedback signal from a console (e.g., as described below with reference to FIG. 4), and actuates the haptic apparatus 320 accordingly. The pressure source 330 applies pressure to the inflatable bladders of the haptic apparatus 320 based on the haptic feedback signal for inflating or deflating the inflatable bladders of the haptic apparatus 320. In one embodiment, the haptic feedback signal identifies a haptic apparatus 320 from a plurality of haptic apparatuses 320 and an amount of actuation (or amount of pressure) to be applied, and the pressure source 330 applies pressure to the inflatable bladders of the haptic apparatus 320 as identified by the haptic feedback signal.

Exemplary System

Figure 4:
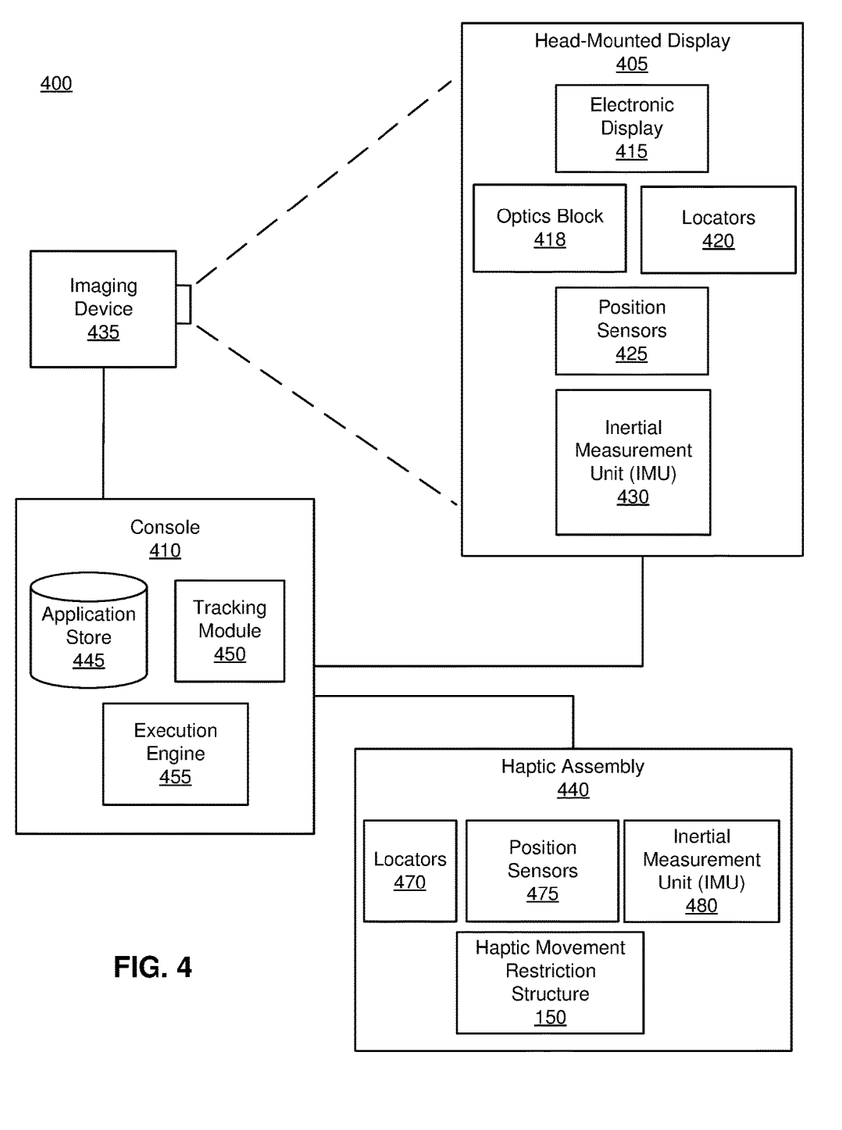
FIG. 4 is a block diagram of a system in which a haptic assembly operates, in accordance with an embodiment.

FIG. 4 is a block diagram of a system 400 in which a console 410 and a haptic assembly 440 operate, in accordance with an embodiment. The system 400 may operate in a VR environment, an AR environment, a MR environment, or some combination thereof. The system 400 shown by FIG. 4 comprises a head-mounted display (HMD) 405 (also referred to as "a headset 405"), an imaging device 435, and a haptic assembly 440, such as the haptic glove 300 described with reference to FIG. 3. While FIG. 4 shows an example system 400 including one HMD 405, one imaging device 435, and one haptic assembly 440, in other embodiments any number of these components may be included in the system 400. For example, there may be multiple HMDs 405 each having an associated haptic assembly 440 and being monitored by one or more imaging devices 435, with each HMD 405, haptic assembly 440, and imaging devices 435 communicating with the console 410. In alternative configurations, different and/or additional components may be included in the system environment 400. Similarly, the functions can be distributed among the components in a different manner than is described here. For example, some or all of the functionality of the console 410 may be contained within the HMD 405.

The HMD 405 is a head-mounted display that presents media to a user. Examples of media presented by the HMD 405 include one or more images, video, audio, or any combination thereof. In some embodiments, audio is presented via an external device (e.g., speakers and/or headphones) that receives audio information from the HMD 405, the console 410, or both, and presents audio data based on the audio information. The HMD 405 may augment views of a physical, real-world environment with computer-generated elements (e.g., images, video, sound, etc.).

The HMD 405 includes an electronic display 415, an optics block 418, one or more locators 420, one or more position sensors 425, and an inertial measurement unit (IMU) 430. The electronic display 415 displays images to the user in accordance with data received from the console 410.

The optics block 418 magnifies received light from the electronic display 415, and corrects optical errors associated with the image light. The corrected image light is presented to a user of the HMD 405. An optical element may be an aperture, a Fresnel lens, a convex lens, a concave lens, a filter, or any other suitable optical element that affects the image light emitted from the electronic display 415. Moreover, the optics block 418 may include combinations of different optical elements. In some embodiments, one or more of the optical elements in the optics block 418 may have one or more coatings, such as anti-reflective coatings.

The locators 420 are objects located in specific positions on the HMD 405 relative to one another and relative to a specific reference point of the HMD 405 on the HMD 405. A locator 420 may be a light emitting diode (LED), a corner cube reflector, a reflective marker, a laser emitter, a type of light source that contrasts with an environment in which the HMD 405 operates, or some combination thereof. In embodiments where the locators 420 are active (i.e., an LED or other type of light emitting device), the locators 420 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 420 are located beneath an outer surface layer of the HMD 405, which is transparent to the wavelengths of light emitted or reflected by the locators 420 or is thin enough not to substantially attenuate the wavelengths of light emitted or reflected by the locators 420. Additionally, in some embodiments, the outer surface or other portions of the HMD 405 are opaque to wavelengths of electromagnetic radiation in the visible spectrum. Thus, the locators 420 may emit light in the IR band under an outer surface that is transparent in the IR band but opaque in the visible band.

The IMU 430 is an electronic device that generates fast calibration data (herein also referred to as "fast calibration information") of the HMD 405 based on measurement signals received from one or more of the position sensors 425. A position sensor 425 generates one or more measurement signals in response to motion of the HMD 405. Examples of position sensors 425 include: one or more accelerometers, one or more gyroscopes, one or more barometers, one or more magnetometers, another suitable type of sensor that detects motion, a type of sensor used for error correction of the IMU 430, or some combination thereof. The position sensors 425 may be located external to the IMU 430, internal to the IMU 430, or some combination thereof.

Based on the one or more measurement signals from one or more position sensors 425, the IMU 430 generates fast calibration data of the HMD 405 indicating an estimated position of the HMD 405 relative to an initial position of the HMD 405. For example, the position sensors 425 include multiple accelerometers to measure translational motion (forward/back, up/down, left/right) and multiple gyroscopes to measure rotational motion (e.g., pitch, yaw, roll) of the HMD 405. In some embodiments, the IMU 430 rapidly samples the measurement signals and calculates the estimated position of the HMD 405 from the sampled data. For example, the IMU 430 integrates the measurement signals received from the accelerometers over time to estimate a velocity vector and integrates the velocity vector over time to determine an estimated position of a reference point of the HMD 405 on the HMD 405. Alternatively, the IMU 430 provides the sampled measurement signals to the console 410, which determines the fast calibration data of the HMD 405. The reference point of the HMD 405 is a point that may be used to describe the position of the HMD 405. While the reference point of the HMD 405 may generally be defined as a point in space; however, in practice the reference point of the HMD 405 is defined as a point within the HMD 405 (e.g., a center of the IMU 430).

The IMU 430 receives one or more calibration parameters of the HMD 405 from the console 410. As further discussed below, the one or more calibration parameters of the HMD 405 are used to maintain tracking of the HMD 405. Based on a received calibration parameter of the HMD 405, the IMU 430 may adjust one or more IMU parameters (e.g., sample rate). In some embodiments, certain calibration parameters of the HMD 405 cause the IMU 430 to update an initial position of the reference point of the HMD 405 so it corresponds to a next calibrated position of the reference point of the HMD 405. Updating the initial position of the reference point of the HMD 405 as the next calibrated position of the reference point of the HMD 405 helps reduce accumulated error associated with the determined estimated position. The accumulated error, also referred to as drift error, causes the estimated position of the reference point of the HMD 405 to "drift" away from the actual position of the reference point of the HMD 405 over time.

The haptic assembly 440 is an apparatus for providing haptic feedback to the user. The haptic assembly 440 includes locators 470, one or more position sensors 475, and an inertial measurement unit (IMU) 480, and the haptic movement restriction structure 150. In some embodiments, the locators 470, one or more position sensors 475, an inertial measurement unit (IMU) 480 are employed to determine a physical position or movement of the haptic assembly 440. In addition, the haptic assembly 440 receives, from the console 410, a haptic feedback signal corresponding to haptic feedback to the user. The haptic assembly 440 provides to the user the haptic feedback of touching a virtual object in a virtual space, according to the haptic feedback signal. Specifically, the haptic assembly 440 provides an amount of resistance to a physical movement of a portion of a user in contact with the virtual object in the virtual space. This may be accomplished using the haptic movement restriction structure 150, which may be incorporated within the haptic assembly 440 to restrict the movement of a user's finger(s).

In one embodiment, the amount of resistance may vary depending on a hardness of the virtual object and force (e.g., measured based on velocity or acceleration) applied by the user. If force applied by the user finger is determined to be insufficient (for example, force is less than the hardness value or a threshold value) to break or deform the virtual object (e.g., rock), the haptic assembly 440 prevents a physical movement of the user finger to move in a direction through the virtual object in the virtual space. To accomplish this, the inflatable bladders 120 of the haptic movement restriction structure 150 of the haptic assembly may be inflated to a certain degree to cause the haptic movement restriction structure 150 to restrict the physical movement of the user's finger.

In one example, if force applied by the user finger is determined to be larger than the hardness of the virtual object to break or penetrate the virtual object (e.g., egg), the haptic assembly 440 can provide no resistance to allow the user movement through the virtual object. In another example, if force applied by the user finger is determined to be larger than the hardness of the virtual object to deform the virtual object (e.g., rubber ball), the haptic assembly 440 can provide an amount of resistance to slow down the physical movement to simulate the deformation. Accordingly, the user can receive a perception of contacting the virtual object. These simulated forces may be achieved by varying the pressure of fluid transmitted to the inflatable bladders 120 of the haptic movement restriction structure 150.

In one embodiment, the haptic feedback signal indicates a position or a portion of the haptic movement restriction structure 150 to be actuated, and an amount of actuation of the position or the portion of the haptic movement restriction structure 150 for providing haptic feedback. In this embodiment, the amount of actuation is determined by, e.g., the console 410, according to a virtual position of the haptic movement restriction structure 150 corresponding to a physical position of the haptic movement restriction structure 150 and a virtual position of a virtual object in a virtual space. The haptic movement restriction structure 150 provides tactile perception of a user touching the virtual object according to the amount of actuation indicated by the haptic feedback signal.

The locators 470 are objects located in specific positions on the haptic assembly 440 relative to one another and relative to a specific reference point of the haptic assembly 440 on the haptic assembly 440. A locator 470 is substantially similar to a locator 420 except that a locator 470 is part of the haptic assembly 440. Additionally, in some embodiments, the outer surface or other portions of the haptic assembly 440 are opaque in the visible band of wavelengths of light. Thus, the locators 470 may emit light in the IR band under an outer surface that is transparent in the IR band but opaque in the visible band.

A position sensor 475 generates one or more measurement signals in response to motion of the haptic assembly 440. The position sensors 475 are substantially similar to the positions sensors 425, except that the position sensors 475 are part of the haptic assembly 440. The position sensors 475 may be located external to the IMU 480, internal to the IMU 480, or some combination thereof.

Based on the one or more measurement signals from one or more position sensors 475, the IMU 480 generates fast calibration data of the haptic assembly 440 indicating an estimated position of the haptic assembly 440 relative to an initial position of the haptic assembly 440. For example, the position sensors 475 include multiple accelerometers to measure translational motion (forward/back, up/down, left/right) and multiple gyroscopes to measure rotational motion (e.g., pitch, yaw, roll) of the haptic assembly 440. In some embodiments, the IMU 480 rapidly samples the measurement signals and calculates the estimated position of the haptic assembly 440 from the sampled data. For example, the IMU 480 integrates the measurement signals received from the accelerometers over time to estimate a velocity vector and integrates the velocity vector over time to determine an estimated position of a reference point of the haptic assembly 440. Alternatively, the IMU 480 provides the sampled measurement signals to the console 410, which determines the fast calibration data of the haptic assembly 440. The reference point of the haptic assembly 440 is a point that may be used to describe the position of the haptic assembly 440. While the reference point of the haptic assembly 440 may generally be defined as a point in space; however, in practice the reference point of the haptic assembly 440 is defined as a point within the haptic assembly 440 (e.g., a center of the IMU 480).

The IMU 480 receives one or more calibration parameters of the haptic assembly 440 from the console 410. As further discussed below, the one or more calibration parameters of the haptic assembly 440 are used to maintain tracking of the haptic assembly 440. Based on a received calibration parameter of the haptic assembly 440, the IMU 480 may adjust one or more IMU parameters (e.g., sample rate). In some embodiments, certain calibration parameters of the haptic assembly 440 cause the IMU 480 to update an initial position of the reference point of the haptic assembly 440 so it corresponds to a next calibrated position of the reference point of the haptic assembly 440. Updating the initial position of the reference point of the haptic assembly 440 as the next calibrated position of the reference point of the haptic assembly 440 helps reduce accumulated error associated with the determined estimated position.

The haptic assembly 440 includes the haptic movement restriction structure 150. The inflatable bladders 120 of the haptic movement restriction structure 150 can be inflated to resist a user movement. In one embodiment, the haptic assembly 440 actuates the inflatable bladders 120 of the haptic movement restriction structure 150 according to the haptic feedback signal from the console 410. In one embodiment, the haptic assembly 440 is a haptic glove through which the console 410 can detect a user hand movement and provide a perception of contacting a virtual object. The imaging device 435 generates slow calibration data in accordance with calibration parameters received from the console 410. Slow calibration data (herein also referred to as "slow calibration information") of the VR/AR headset includes one or more images showing observed positions of the locators 420 associated with the HMD 405 that are detectable by the imaging device 435. Similarly, slow calibration data of the haptic assembly 440 includes one or more images showing observed positions of the locators 470 associated with the haptic assembly 440 that are detectable by the imaging device 435. In one aspect, the slow calibration data includes one or more images of both the HMD 405 and haptic assembly 440. The imaging device 435 may include one or more cameras, one or more video cameras, any other device capable of capturing images including one or more of the locators 420 and 470, or any combination thereof. Additionally, the imaging device 435 may include one or more filters (e.g., used to increase signal to noise ratio). The imaging device 435 is configured to detect light emitted or reflected from locators 420 and 470 in a field of view of the imaging device 435. In embodiments where the locators 420 and 470 include passive elements (e.g., a retroreflector), the imaging device 435 may include a light source that illuminates some or all of the locators 420 and 470, which retro-reflect the light towards the light source in the imaging device 435. Slow calibration data is communicated from the imaging device 435 to the console 410, and the imaging device 435 receives one or more calibration parameters from the console 410 to adjust one or more imaging parameters (e.g., focal length, focus, frame rate, ISO, sensor temperature, shutter speed, aperture, etc.).

The console 410 provides media to the HMD 405 for presentation to the user in accordance with information received from one or more of: the imaging device 435, the HMD 405, and the haptic assembly 440. The console 410 may also instruct the haptic assembly 440 to provide haptic feedback including a perception of a user contacting a virtual object. In the example shown in FIG. 1, the console 410 includes an application store 445, a tracking module 450, and an execution engine 455. Some embodiments of the console 410 have different modules than those described in conjunction with FIG. 4. Similarly, the functions further described below may be distributed among components of the console 410 in a different manner than is described here.

The application store 445 stores one or more applications for execution by the console 410. An application is a group of instructions, that when executed by a processor, generates content for presentation to the user. Content generated by an application may be in response to inputs received from the user via movement of the HMD 405 or the VR/AR haptic assembly 440. Examples of applications include: gaming applications, conferencing applications, video playback application, or other suitable applications.

The tracking module 450 calibrates the VR/AR system 400 using one or more calibration parameters and may adjust one or more calibration parameters to reduce error in determination of the position of the HMD 405 and/or the haptic assembly 440.

The tracking module 450 tracks movements of the HMD 405 using slow calibration information of the HMD 405 from the imaging device 435. The tracking module 450 determines positions of a reference point of the HMD 405 using observed locators from the slow calibration information and a model of the HMD 405. The tracking module 450 also determines positions of a reference point of the HMD 405 using position information from the fast calibration information of the HMD 405. Additionally, in some embodiments, the tracking module 450 may use portions of the fast calibration information, the slow calibration information, or some combination thereof of the HMD 405, to predict a future location of the headset 405. The tracking module 450 provides the estimated or predicted future position of the HMD 405 to the execution engine 455.

The execution engine 455 executes applications within the system environment 400 and receives position information, acceleration information, velocity information, predicted future positions, or some combination thereof of the HMD 405 from the tracking module 450. Based on the received information, the execution engine 455 determines content to provide to the HMD 405 for presentation to the user. For example, if the received information indicates that the user has looked to the left, the execution engine 455 generates content for the HMD 405 that mirrors the user's movement in a virtual environment. Additionally, the execution engine 455 performs an action within an application executing on the VR console 410 in response to detecting a motion of the haptic assembly 440 and provides feedback to the user that the action was performed. In one example, the execution engine 455 instructs the HMD 405 to provide visual or audible feedback to the user. In another example, the execution engine 455 instructs the haptic assembly 440 to provide haptic feedback including a perception of a user touching a virtual object.

In addition, the execution engine 455 receives position information, acceleration information, velocity information, predicted future positions, or some combination thereof of the haptic assembly 440 from the tracking module 450 and determines whether a virtual touch event occurred. A virtual touch event herein refers to an event of a user contacting a virtual object in a virtual space. For example, an image of a virtual object is presented to the user on the HMD 405. Meanwhile, the execution engine 455 collectively analyzes positions of multiple sensors of the haptic assembly 440 through the tracking module 450, and generates a three dimensional mapping of the haptic assembly 440 describing the position and the shape of the haptic assembly 440. The three dimensional mapping of the haptic assembly 440 describes coordinates of various parts of the haptic assembly 440 in a virtual space corresponding to physical positions of the parts of the haptic assembly 440 in reality. Responsive to the user performing an action to grab the virtual object or the user being contacted by the virtual object, the execution engine 455 determines that the virtual touch event occurred.

In one embodiment, the execution engine 455 compares coordinates of a virtual object and a coordinate of the haptic assembly 440 in a virtual space to determine whether a virtual touch event occurred. The execution engine 455 obtains a coordinate of the virtual object in a virtual space, in accordance with an image presented via the HMD 405. Additionally, the execution engine 455 obtains a coordinate of the haptic assembly 440 (e.g., haptic glove) corresponding to a physical position of the VR/AR haptic assembly 440 from the tracking module 450 or the three dimensional mapping of the haptic assembly 440. Then, the execution engine 455 compares the coordinate of the virtual object in the virtual space and the coordinate of the haptic assembly 440 in the virtual space. For example, if two coordinates of the virtual object and the haptic assembly 440 overlap or are approximate to each other within a predetermined distance for a predetermined amount of time (e.g., 1 second), the console 410 determines the virtual touch event occurred.

In one embodiment, the execution engine 455 generates a haptic feedback signal to simulate a user touching a virtual object (i.e., provide a perception to a user that the user is touching an object). Responsive to detecting the virtual touch event, the execution engine 455 determines an amount of resistance to provide to the user. For example, if a user's finger is in touch with a virtual object, the execution engine 455 determines an amount of force of the user movement, based on the velocity or acceleration of the user movement. The velocity or acceleration of the user movement can be obtained, for example, according to the movement tracked by the tracing module 450. The execution engine 455 obtains a value of hardness of the virtual object in contact with the user finger, and compares the value of hardness with the determined force. In one example, responsive to determining that the force of the user movement is less than the value of hardness (or a threshold value) of the virtual object, the execution engine 455 determines that the user cannot bend the finger in a physical direction corresponding to a virtual direction through the virtual object. Responsive to determining that the force of the user movement is larger than the value of hardness (or the threshold value) of the virtual object, the execution engine 455 determines that the user can bend the finger in the physical direction corresponding to the virtual direction through the virtual object. In one example, the execution engine 455 determines that the user movement breaks the virtual object (e.g., egg), and determines to provide no resistance to the user movement. In another example, the execution engine 455 determines that the user movement deforms the virtual object (e.g., marshmallow), and determines to an amount of resistance corresponding to the deformation of the virtual object and the force of the user movement. The execution engine 455 determines a portion (e.g., a coordinate or a position) of the haptic assembly 440 to be actuated (e.g., inflated or deflated) and amount of actuation (e.g., a degree or amount of inflation). The execution engine 455 provides the haptic feedback signal indicating the portion of the haptic assembly 440 and the amount of actuation to the haptic assembly 440 for executing the haptic feedback. For example, the execution engine 455 may instruct one or more inflatable bladders of a haptic movement restriction structure 150 of the haptic assembly 440 to inflate or deflate to provide the haptic feedback.

Exemplary Flow for Haptic Feedback for Haptic Movement Restriction Structure

Figure 5:
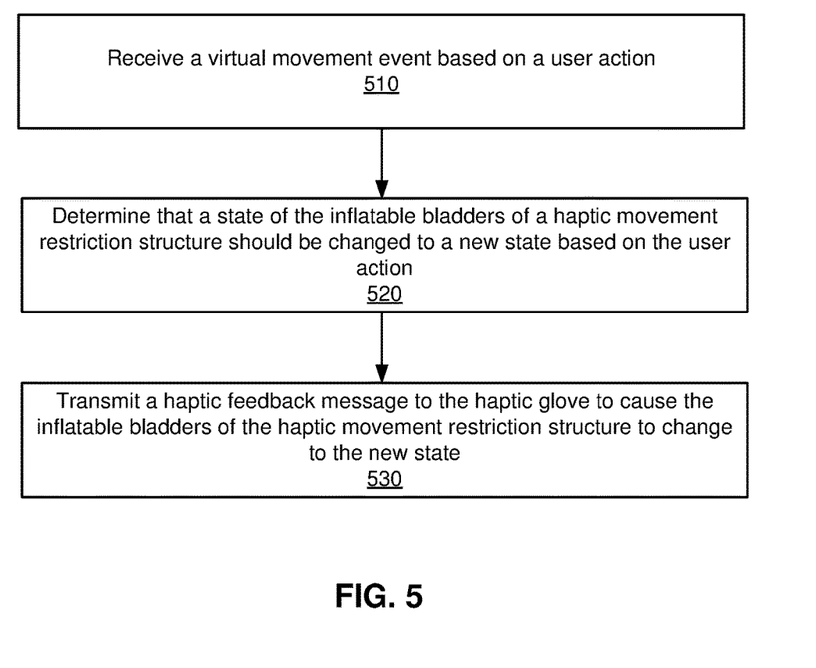
FIG. 5 is a flow chart illustrating a process of providing haptic feedback responsive to a virtual touch event in a virtual space, in accordance with an embodiment.

FIG. 5 is a flow chart illustrating a process of providing haptic feedback responsive to a virtual touch event in a virtual space, in accordance with an embodiment. In one embodiment, the process of FIG. 5 is performed by a console (e.g., console 410 of FIG. 4). Other entities may perform some or all of the steps of the process in other embodiments. Likewise, embodiments may include different and/or additional steps, or perform the steps in different orders.

The console receives 510 a virtual movement event based on a user action. In one embodiment, the console receives fast calibration data from the haptic glove and/or slow calibration data from the imaging device, and then determines that the user action is a hand movement. In one approach, the console obtains 3-D map of the user hand describing coordinates of various parts of the haptic glove in a virtual space corresponding to physical positions of the parts of the haptic glove in reality based on the fast calibration data and/or the slow calibration data. The console compares the coordinate of the virtual object in the virtual space and the coordinate of the haptic glove in the virtual space to determine whether a user action occurred.

Responsive to determining the user action occurred, the console determines 520 a state of the inflatable bladders of a haptic movement restriction structure (e.g., haptic movement restriction structure 150) should be changed to a new state based on the user action. The system may support multiple states, which may correspond to different degrees of restriction, and may also correspond to different degrees of restriction at different locations of the haptic movement restriction structure. The different degrees of restriction may correspond to different amounts of inflation in the haptic movement restriction device. For example, responsive to the user pressing a virtual object (e.g., a ball) in a virtual space with a bottom surface of an index finger, the console determines that a user action occurred, and identifies the bottom surface of the index finger is in contact with the virtual object. The console determines that the state of the haptic movement restriction structure should be set to a particular restriction level corresponding to a force that could be sensed by the user in response to touching the virtual object.

The console determines an amount of inflation for the inflatable bladders in response. For example, responsive to determining that the bottom surface of the index finger is in contact with the virtual object, the console determines the force of the hand movement and compares the determined force with the value of hardness of the virtual object in contact. Responsive to determining that the value of the hardness is greater than the force of the hand movement, the console determines that the index finger is not allowed to bend inward and also determines an amount of actuation of the haptic apparatus for preventing the inward movement of the index finger. This amount of actuation corresponds to an inflation value for all or some of the inflatable bladders of the haptic movement restriction structure. In one example, responsive to determining that the value of the hardness is less than the force of the hand movement, the console determines that the virtual object (e.g., glass) is shattered and also determines an amount of actuation of the haptic apparatus for providing no resistance, or an instant (e.g., temporary) resistance, to the inward movement. In another example, responsive to determining that the value of the hardness is less than the force of the hand movement, the console determines that virtual object (e.g., ball) should be deformed, and also determines an amount of actuation of the haptic apparatus for impeding (e.g., slowing or reducing a force of) the inward movement.

The console transmits 530 a haptic feedback message to the haptic glove to cause the inflatable bladders of the haptic movement restriction structure to change to the new state. The haptic feedback message includes details of the haptic feedback to be provided, according to the amount of actuation determined, to the inflatable bladders of the haptic movement restriction structure. The haptic feedback message identifies the haptic movement restriction structure and an amount of actuation for the inflatable bladders. The inflatable bladders inflate, as described in detail with respect to FIGS. 1 through 4.

The console may repeat the steps of 510 through 530 during operation.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A haptic device comprising:
   an elastic planar member;
   an inelastic planar member attached to the elastic planar member;
   an inflatable bladder attached to a first surface of the inelastic planar member; and
   wherein an inflation of the inflatable bladder causes a curvature in the inelastic planar member, the curvature increasing a rigidity of the inelastic planar member and having a concavity opposite to the first surface of the inelastic planar member.

2. The haptic device of claim 1, further comprising one or more additional elastic planar members and one or more additional inelastic planar members attached to the inelastic planar member, each additional inelastic planar member attached to an additional elastic planar member of the one or more additional elastic planar members.

3. The haptic device of claim 2, wherein a combined modulus of the one or more additional elastic planar members and the elastic planar member is equivalent to an average bending force of a human finger.

4. The haptic device of claim 2, wherein the one or more additional elastic planar members and the elastic planar member stretch a combined distance equal to an elongation of a dorsal surface of an average sized human index finger when the average sized human index finger is moved from a fully elongated to a fully curved position.

5. The haptic device of claim 2, wherein additional inflatable bladders are attached to each of the one or more additional inelastic planar members along surfaces of the one or more additional inelastic planar members along one axis.

6. The haptic device of claim 1, wherein the elastic planar member and the inelastic planar member are placed within a haptic glove on a dorsal side of a glove digit.

7. The haptic device of claim 1, wherein the inflatable bladder is attached to the inelastic planar member at more than one attachment point.

8. The haptic device of claim 1, wherein the inflatable bladder is inflated by a fluid transfer device upon receipt of a haptic feedback signal.

9. The haptic device of claim 1, wherein the inflatable bladder is recessed within the inelastic planar section.

10. The haptic device of claim 1, wherein the elastic planar member is selected from a group consisting of: an elastic polymer material, an inelastic woven fabric, and silicon rubber.

11. A haptic device comprising:
    a glove body;

an elastic planar member coupled to a glove digit of the glove body;

an inelastic planar member attached to the elastic planar member; and an inflatable bladder attached to a first surface of the inelastic planar member; and wherein an inflation of the inflatable bladder causes a curvature in the inelastic planar member, the curvature increasing a rigidity of the inelastic planar member and having a concavity opposite to the first surface of the inelastic planar member.

12. The haptic device of claim 11, further comprising one or more additional elastic planar members and one or more additional inelastic planar members attached to the inelastic planar member, each additional inelastic planar member attached to an additional elastic planar member of the one or more additional elastic planar members.

13. The haptic device of claim 12, wherein a combined modulus of the one or more additional elastic planar members and the elastic planar member is equivalent to an average bending force of a human finger.

14. The haptic device of claim 12, wherein the one or more additional elastic planar members and the elastic planar member stretch a combined distance equal to an elongation of a dorsal surface of an average sized human index finger when the average sized human index finger is moved from a fully elongated to a fully curved position.

15. The haptic device of claim 12, wherein additional inflatable bladders are attached to each of the one or more additional inelastic planar members along surfaces of the one or more additional inelastic planar members along one axis.

16. The haptic device of claim 11, wherein the elastic planar member and the inelastic planar member are placed within the glove digit on a dorsal side of the glove digit.

17. The haptic device of claim 11, wherein the inflatable bladder is attached to the inelastic planar member at more than one attachment point.

18. The haptic device of claim 11, wherein the inflatable bladder is inflated by a fluid transfer device upon receipt of a haptic feedback signal.

19. The haptic device of claim 11, wherein the inflatable bladder is recessed within the inelastic planar section.

20. The haptic device of claim 11, wherein the elastic planar member is selected from a group consisting of: an elastic polymer material, an inelastic woven fabric, and silicon rubber.

* * * * *